Figure 1:
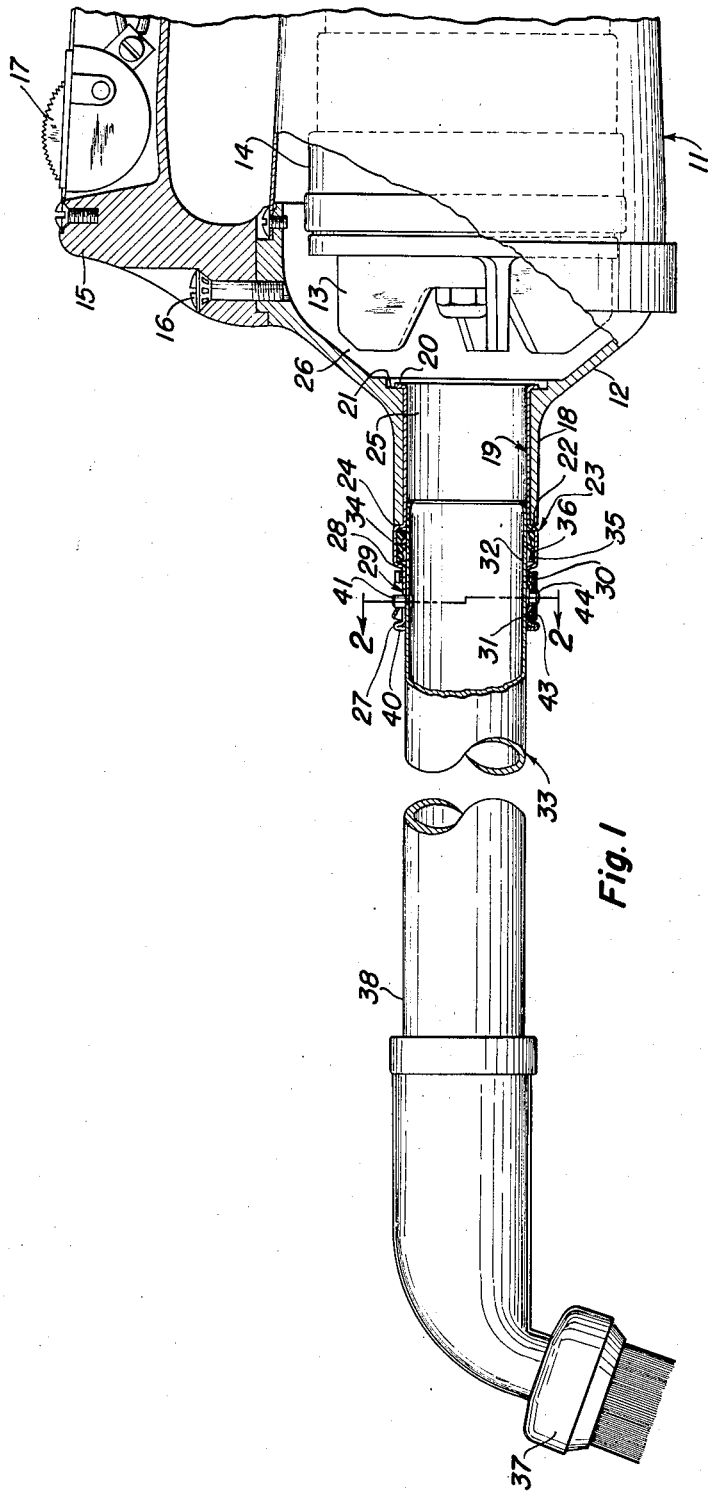

April 29, 1958 P. H. COUTTS 2,832,612
SUCTION CLEANER COUPLING WITH SPRING BIASED CATCH
Filed Oct. 11, 1954 2 Sheets-Sheet 1

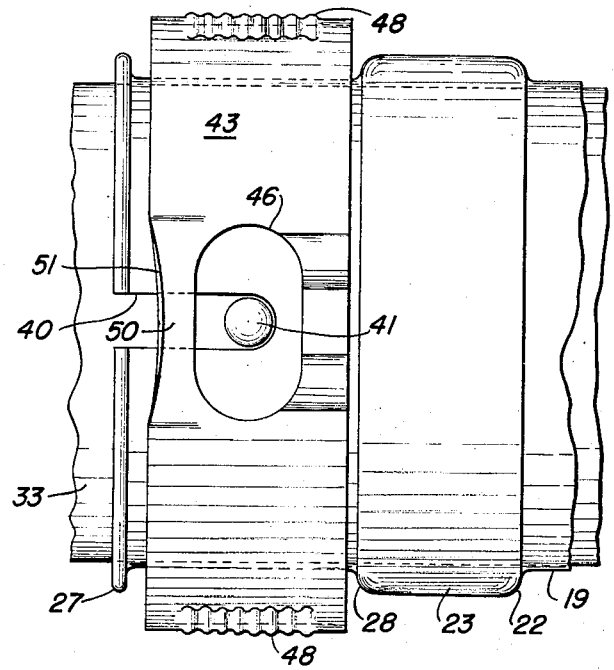
Fig. 3
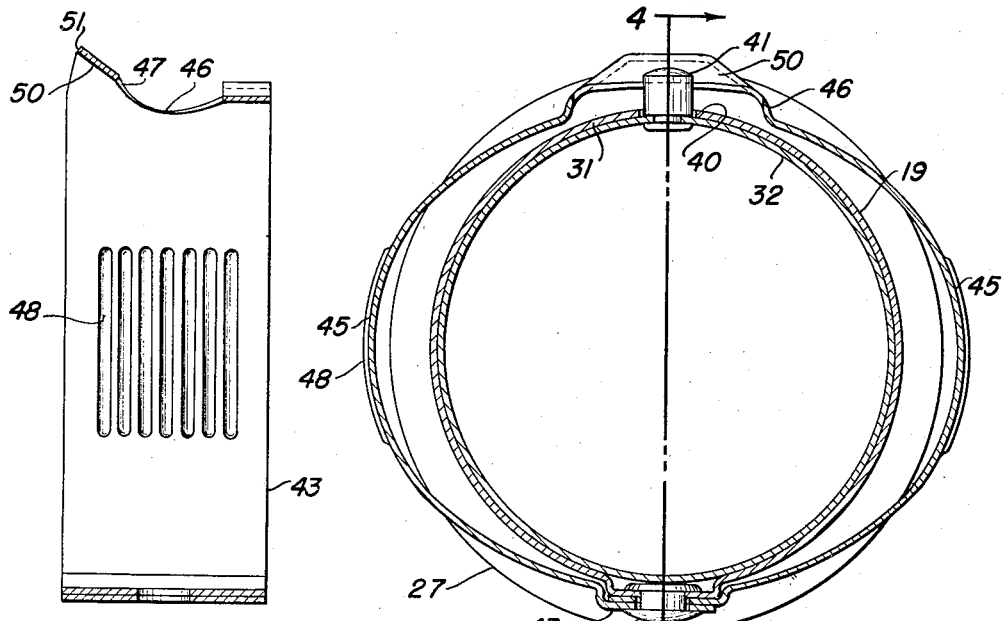
Fig. 4
Fig. 2

_United States Patent Office_ 2,832,612
Patented Apr. 29, 1958

2,832,612

SUCTION CLEANER COUPLING WITH SPRING BIASED CATCH

Peter H. Coutts, Toronto, Ontario, Canada, assignor to The Hoover Company, North Canton, Ohio, a corporation of Ohio Application October 11, 1954, Serial No. 461,475

Claims priority, application Great Britain December 4, 1953

2 Claims. (Cl. 285—7)

The present invention relates to a coupling and more particularly to detachably connecting tubes conducting an air stream to suction cleaners.

An object of the invention is to provide a coupling for two telescoping members and having a latch exterior of the outer member to removably connect the inner member. Another object is to provide a coupling for two telescoping members, the outer of which has a bearing surface for the inner member and a latch exterior of the outer member to removably connect the inner member at the bearing surface. A further object is to provide a coupling for two telescoping members and having an oval spring latch on the exterior of the outer member and operable by flexing the spring to unlock the members. Other objects and advantages of the invention will become apparent from the following description and drawings wherein:

Figure 1 is a partly sectional view showing the coupling connecting a tubular wand to a suction cleaner, Figure 2 is a section on line 2—2 of Figure 1, Figure 3 is a top plan view of Figure 2, and Figure 4 is a sectional view on line 4—4 of Figure 2 showing only the spring latch.

The embodiment of the invention herein disclosed comprises a cleaner, only partially shown, of the hand-held type provided with a casing 11 having an end cap 12, and disposed within the casing 11 is suction creating fan 13 operated by a motor 14, and the fan discharges dirt laden-air through the casing 11 to an attached unshown dirt filtering bag. A cleaner carrying handle 15 is attached by screws 16 to the casing and is provided with a switch 17 to control the circuit to the motor 14.

The end cap 12 has an extension 18 lined by a socket or tubular member 19 rigidly secured to the end cap by a spun end flange 20 seated in an annular shoulder 21, and by a shoulder 22 of an annular projecting rib 23 on the member 19 which abuts the outer end 24 of the end cap extension 18. The opening 25 at the inner end of the tube 19 forms the inlet to a fan chamber 26. At the extreme end of the socket member 19 is an annular rib 27 spaced from a shoulder 28 of the rib 23 to define therebetween an annular depressed recess 29 the wall 30 of which along its inner surface provides a bearing area 31 for one end 32 of an inner tubular member 33 removably inserted in the socket member 19. The rib 23 and its shoulders 22—28 define a recess 34 exposed to the interior of the socket member 19, and arranged in the recess 34 is a resilient ring 35 having a corrugated surface 36 which engages the exterior surface of the inner tube 33 to provide a substantially air tight seal between the two tubular members. A suitable cleaning tool 37 is removably attached to the end 38 of the inner tube 33 to convey dirt laden-air from the surface being cleaned to the fan chamber 26.

A latch mechanism to removably connect the tubular members 19 and 33 is provided and comprises a marginal longitudinal slot 40 in the outer tube 19 extending into the bearing area 31 short of the shoulder 28 to receive a pin 41 adjacent the end of the inner tube 33. An oval spring band 43 is arranged in the recess 29 between the shoulders 27—28, and is secured to the outer tube 19 by a rivet 44 diametrically opposite the slot 40. The minor axis of the spring 43 passes through a line joining the slot 40 and the rivet 44 and its dimensions are such that the spring bears against the tube 19 in the area of the slot 40, and the spring 43 at the opposite ends 45—45 of the major axis is spaced from the tube 19 on each side between the slot 40 and the rivet 44. Above the slot 40 the spring 43 is provided with an opening 46 defined by a peripheral wall 47 to receive the pin 41 on the inner tube 33. Opposite portions of the spring are corrugated as indicated at 48 to provide a gripping surface for the operator's fingers to compress the spring at its major axis and raise the peripheral edge 47 of the opening 46 above the pin 41 to allow the latter to pass thereunder as the inner tube 33 is being withdrawn.

A portion of the spring 43 above the slot 40 and towards the entrance thereof has a ramp or cam surface 50 leading downwardly to the opening 46 to permit the pin 41 to be inserted under the cam edge 51 and thereafter engage the cam surface 50 for forcing the spring 43 away from the tube 19 until the pin 41 enters the opening 46 at which time the spring 43 returns to its normal position whereby the defining edge 47 of the opening 46 locks the pin 41 to prevent separation of the inner and outer tubes.

When it is desired to connect the tubes 19 and 33 the inner end of the latter is telescoped within the outer tube 19 with the pin 41 in the slot 40. Continued inward movement of the tube 33 causes the pin 41 to engage the cam surface 50 to raise the latter and the spring 43 away from the outer tube 19, the spring 43 permitting such movement by flexing along its minor axis, until the pin 41 enters the opening 46 at which time the spring area adjacent the slot 40 again rests on the outer tube 19 to retain the pin 41 within the opening 46 and lock the tubes together. The shoulders 27 and 28 of the recess 29 prevent movement of the spring 43 along the outer tube 19 when the tool 37 is pressed against the surface being cleaned to thereby provide a rigid connection between the tubes. The pin 41 when in locked position is within the area of the bearing surface 31 and the latter is encircled by the spring 43 to provide a firm connection between the tubes 19 and 33.

In order to separate the tubes the operator applies pressure to the spring 43 at the points 48—48 to compress the spring along its major axis which causes the cam surface 50 to be raised above the pin 41 whereby the latter may be removed from the defining edge 47 of the opening 46 and beyond the slot 40 to uncouple the tubes so that they may be separated.

While I have shown and described but one embodiment of my invention, it is to be understood that this embodiment is to be taken as illustrative only and not in a limiting sense. I do not wish to be limited to the particular structure shown and described but to include all equivalent variations except as limited by the scope of the claims.

I claim:

1. A coupling for suction cleaners comprising a socket member having a marginal slot at one end and extending inwardly thereof, a member insertable in said one end of said socket member and having pin means insertable in said slot, an oval spring arranged exteriorly of said socket member with one end of its minor axis adjacent said slot, means securing said spring at the other end of its minor axis to said socket member at a point diametrically opposite said slot, means forming an opening in said spring at said slot to receive said pin means and lock said members together, said spring spaced from said socket member at the opposite ends of its major axis whereby pressure thereon flexes said spring outwardly of said pin means to unlock said members and permit their separation, the portion of said spring between said opening and the entrance end of said spring comprising a cam surface leading to said opening to receive said pin means and flex said spring on its minor axis for passage of said pin means into said opening and lock said members together.

2. A coupling for suction cleaners comprising an outer socket member, an inner member insertable in one end of said socket member, a pair of spaced ribs on the exterior of said socket member at said one end and forming a recess, the inner wall of said recess forming a bearing surface slidably receiving said inner member to support the latter, a marginal slot at said one end and extending into said bearing surface, pin means on said inner member insertable in said slot, an oval spring arranged exteriorly of said socket member between said spaced ribs, means securing said spring at only one end of its minor axis to said socket member at a point opposite said slot, means forming an opening in said spring at the other end of its minor axis and facing said slot to receive said pin means and lock said members together, the portion of said spring between said opening and the entrance end of said spring comprising a cam surface leading to said opening to receive said pin means and flex said spring on its minor axis for passage of said pin means into said opening and lock said members together at said bearing surface, said spring being spaced from said socket member at the opposite ends of its major axis whereby pressure thereon flexes said spring outwardly of said pin means at the other end of said minor axis to unlock said members and permit their separation.

References Cited in the file of this patent

UNITED STATES PATENTS

| | | |
|---|---|---|
| 549,733 | Limbert | Nov. 12, 1895 |
| 2,072,939 | Betts | Mar. 9, 1937 |
| 2,665,148 | Humphrey et al. | Jan. 5, 1954 |